Dec. 26, 1950   B. G. GALLASCH   2,535,128
MECHANICAL STAGE FOR MICROSCOPES
Filed Dec. 24, 1946
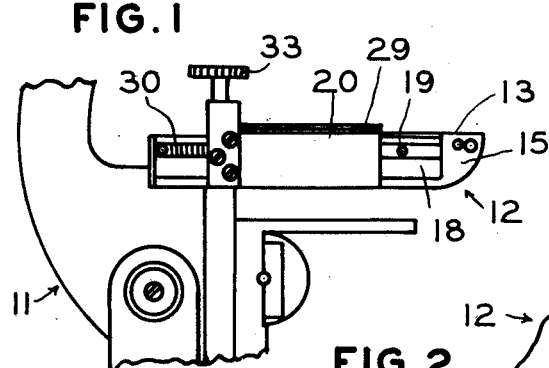
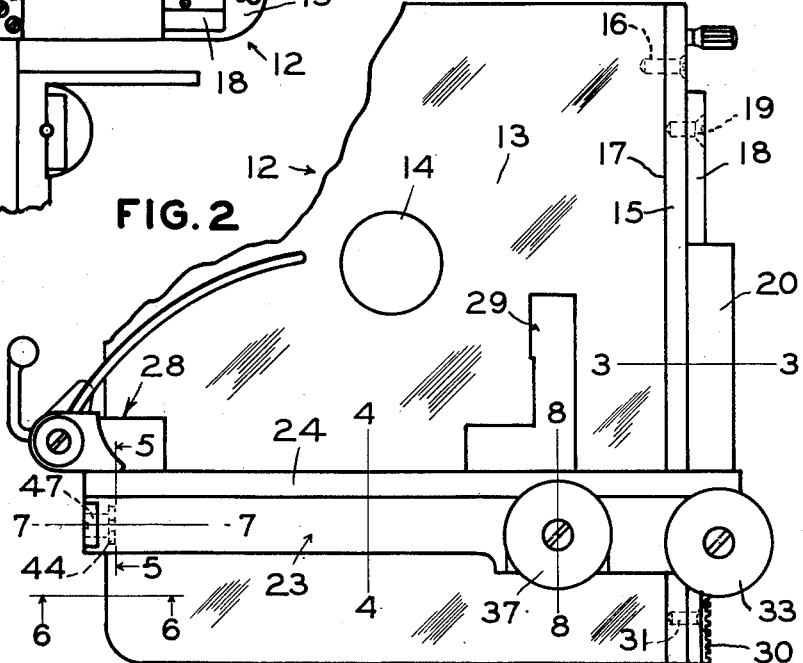
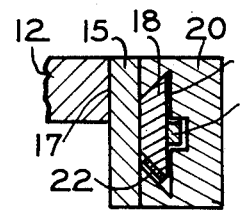
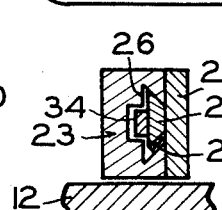
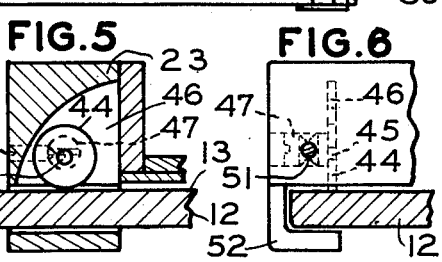
B.G. GALLASCH
Inventor
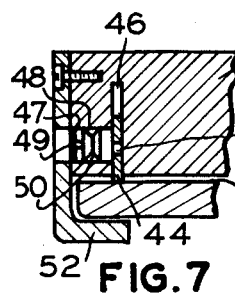
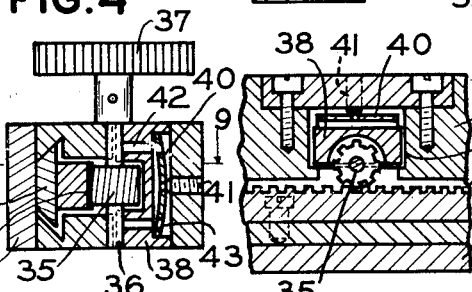
Attorney Patented Dec. 26, 1950

2,535,128

UNITED STATES PATENT OFFICE 2,535,128

MECHANICAL STAGE FOR MICROSCOPES

Bernhardt George Gallasch, Rochester, N. Y., assignor to Bausch & Lomb Optical Company, Rochester, N. Y., a corporation of New York Application December 24, 1946, Serial No. 718,233

1 Claim. (Cl. 88—39)

The present invention relates to improvements in microscopes and more particularly it has reference to mechanical stages by which specimens are moved across the stage of a microscope.

Many of the delicate tasks performed by microscopists require a mechanism for moving the specimen which is capable of minute movements in a smooth and reliable manner. However, when the slides and journals of the traversing mechanism are closely and accurately fitted, this requirement is difficult to attain and very often the action is characterized by abrupt or jumpy starts. Moreover, when the arm of the mechanical stage is moved across the stage surface, the friction therebetween is detrimental to smooth operation.

It is an object of the present invention to provide a novel device of the above type in which the difficulties mentioned are eliminated in a simple and efficient manner.

Further objects of this invention are to provide an adjustable antifrictional bearing for supporting one end of a mechanical stage arm on the stage and also to provide mechanism for moving the arm in a smooth and even manner.

These and other objects and advantages will be apparent by reference to the following description and accompanying drawing in which:

Fig. 1 is a fragmentary view at a reduced scale of a microscope showing a preferred embodiment of my invention mounted thereon, Fig. 2 is a top view of the stage of a microscope with a mechanical stage mechanism mounted thereon, Fig. 3 is a sectional view at an enlarged scale taken on the line 3—3 of Fig. 2, Fig. 4 is a sectional view at an enlarged scale taken on the line 4—4 of Fig. 2, Fig. 5 is a sectional view at an enlarged scale taken on the line 5—5 of Fig. 2, Fig. 6 is a sectional view at an enlarged scale taken on the line 6—6 of Fig. 2, Fig. 7 is a sectional view at an enlarged scale taken on the line 7—7 of Fig. 2, Fig. 8 is a sectional view at an enlarged scale taken on the line 8—8 of Fig. 2, and Fig. 9 is a sectional view at an enlarged scale taken on line 9—9 of Fig. 8.

A microscope embodying a preferred form of my invention is illustrated in the drawing in which the numeral 11 designates a microscope stand having a stage 12, on the upper surface 13 of which a specimen is held for examination. Extending through the stage 12, an opening 14 is provided over which the specimen is placed for examination so that it will be transilluminated by light rays projected from underneath the stage. It will be understood that the usual optical system, not shown, for illuminating and forming an enlarged image of the specimen is part of the microscope shown in Fig. 1.

On the stage 12 a mechanical stage mechanism is provided for moving the specimen across the stage surface 13 comprising a mounting plate 15 secured by any suitable means such as screws 16 against the vertical straight edge 17 of the stage. A rail 18 held by suitable means such as screws 19 against the mounting plate 15 has a sliding head 20 traversably mounted thereon. Rail 18 is preferably of dovetailed shape in cross section as shown in Fig. 3 and a corresponding dovetailed groove 21 loosely fitting the rail 18 is formed in the head 20. Lost motion between the rail 18 and groove 21 is taken up by a flat normally-curved spring 22 confined in the clearance space between the rail and groove.

Secured to the head 20 by suitable means, not shown, is an arm 23 extending across the surface 13 and being free at the outer end, said arm having a bar 24 slidably mounted thereon. The slidable connection between the arm 23 and bar 24 is of similar construction to that shown in Fig. 3. As best shown in Fig. 4, the slidable bar 24 is provided with a dovetailed rail 25 loosely fitting a groove 26 in the arm 23 and having a flat spring 27 held in the clearance space therebetween. Specimen holders 28 and 29 which, as shown in Fig. 2, are particularly adapted to hold a specimen plate, not shown, are fixed to the slidable bar 24.

For moving the specimen in a "fore" and "aft" direction parallel to the mounting plate 15, the rail 18 has a rack 30 fixed thereto by any suitable means, such as screws 31, and has a pinion, not shown, meshed therewith which is rotated by a knob 33. Movement of the specimen in a crosswise direction is accomplished by a rack 34 attached to the bar 24 and meshing with pinion 35 which is journaled by a shaft 36 in the arm 23. A knob 37 is attached to the shaft for rotating the pinion 35. The shaft 36 is journaled in a two-part bearing, one part of the bearing being formed in the arm 23 and the opposite part being formed in a pillow block 38 that loosely fits within a recess 39 in the arm 23.

In this type of bearing, the complementary parts are usually tightly assembled together creating in effect a solid bearing. In the present device, however, the looseness of the fit of the pillow block 38 within the recess 39 permits the bearing surfaces of the block to properly align with the opposite bearing surfaces thus eliminating any binding side pressure. An arched flat spring 40 seated on top of the pillow block 38 is selectively stressed by an adjustment screw 41 to resiliently press the block 38 with any desired pressure against the shaft 36. Openings 42 and 43 in the pillow block 38 and spring 40, respectively, are provided through which a suitable lubricant may be forced by first removing the adjustment screw 41 and inserting a lubricant nozzle in the screw hole. The overall advantage to be gained by this construction of the bearing and its adjustment mechanism is the great reduction in static bearing friction which opposes initiation of rotation of the shaft, thus insuring a smooth start of the rotation of the shaft.

An outstanding feature of my invention is the antifrictional bearing preferably in the form of a roller 44 by which the free end of the arm 23 is supported slightly above the surface 13 so as to prevent sliding friction from interfering with the smooth and easy movement of the arm. Roller bearing 44 is rotatably mounted on an axle or journal pin 45 extending crosswise of a narrow slot 46 formed in the arm 23 for housing the roller. Journal pin 45 has an enlarged cylindrical body portion 47 extending integrally and eccentrically therefrom constituting an adjustment means therefor, said body being rotatably mounted in a bore 48. The amount of projection of the periphery of the roller 44 below the undersurface of the arm 23 may be changed by rotating the body 47. Any desired means of rotating the body portion 47 may be provided such as a screw driver slot 49 extending across the end surface of the body portion.

In order to lock the roller journal pin 45 in the proper operative axial position and desired rotational setting, an annular V groove 50 is formed in the cylindrical surface of the body portion 47. A set screw 51 having a tip which is pointed to fit the groove 50 and is arranged in alignment therewith cooperates with the groove in the body 47 to provide the locking means for the axle pin 45, since the pin is integral with body 47.

An arm guide 52 having a hook-like extension beneath the stage 12 is fixed in any desired manner to the free end of the arm 23 to prevent the arm from being lifted vertically away from the stage 12.

When it is desired to change the clearance between the arm 23 and surface 13, the locking screw 51 is first loosened, a screw driver is inserted into the slot 49 through an aligned clearance opening in the arm guide 52 and the axle or journal pin 45 is thereby rotated until the projection of the roller bearing 44 below the arm 23 has been correctly set. Then the locking screw 51 is again tightened.

It will be seen that the mechanism provided by this invention promotes a smooth and even action of the mechanical stage mechanism wherein abrupt starts are avoided. The advantageous construction of the sliding connections, shaft bearings and in particular the arm-supporting roller 44 causes reduction of the effects of static and sliding friction to a minimum.

Although but certain forms of the invention have been shown and described in detail, these forms are not exclusive and changes may be made in the form and arrangement of the parts and substitutions may be made without departing from the spirit of the invention as defined in the appended claim.

I claim:

A mechanical stage positioned on the upper surface of a microscope stage comprising an overhanging arm having a free end adapted to be moved along said surface, a rotatable bearing member projecting from said arm and contacting said surface to space the arm from said surface, a journal pin on which said bearing member rotates, said pin having a cylindrical eccentric surface integral therewith by which said pin is mounted within a bore in the arm, and locking means for holding said eccentric surface and pin in a stationary position longitudinally and rotationally.

BERNHARDT GEORGE GALLASCH.

REFERENCES CITED

The following references are of record in the file of this patent:

UNITED STATES PATENTS

| Number | Name | Date |
|---|---|---|
| 536,552 | Swift | Mar. 26, 1895 |
| 588,689 | Bausch | Aug. 24, 1897 |
| 878,031 | Adams | Feb. 4, 1908 |
| 893,957 | Watkins | July 21, 1908 |
| 1,007,978 | Sauveur | Nov. 7, 1911 |
| 1,188,316 | Pierce | June 20, 1916 |
| 1,798,634 | Schafer | Mar. 31, 1931 |
| 1,811,508 | Klages | June 23, 1931 |
| 1,974,606 | Fassin | Sept. 25, 1934 |